United States Patent
Jun

(10) Patent No.: US 10,352,262 B2
(45) Date of Patent: Jul. 16, 2019

(54) SPEED LIMITING DEVICE, VEHICLE HAVING THE SAME AND METHOD FOR CONTROLLING THE SAME

(71) Applicants: Hyundai Motor Company, Seoul (KR); Kia Motors Corporation, Seoul (KR)

(72) Inventor: SungHwan Jun, Incheon (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 50 days.

(21) Appl. No.: 15/649,292

(22) Filed: Jul. 13, 2017

(65) Prior Publication Data
US 2018/0080399 A1 Mar. 22, 2018

(30) Foreign Application Priority Data

Sep. 22, 2016 (KR) .................... 10-2016-0121660

(51) Int. Cl.
*F02D 41/02* (2006.01)
*F02D 41/12* (2006.01)
*B62D 15/02* (2006.01)
*B60C 23/02* (2006.01)
*F02D 31/00* (2006.01)

(52) U.S. Cl.
CPC .......... *F02D 41/021* (2013.01); *B60C 23/02* (2013.01); *B62D 15/021* (2013.01); *F02D 31/002* (2013.01); *F02D 41/12* (2013.01); *B60Y 2300/18175* (2013.01); *B60Y 2300/433* (2013.01); *B60Y 2400/3032* (2013.01); *F02D 2200/101* (2013.01); *F02D 2200/50* (2013.01); *F02D 2200/501* (2013.01); *F02D 2200/60* (2013.01); *F02D 2200/602* (2013.01)

(58) Field of Classification Search
None
See application file for complete search history.

(56) References Cited

U.S. PATENT DOCUMENTS 9,409,450 B2 * 8/2016 Dean .................... B60C 23/003
10,246,123 B2 * 4/2019 Ko ....................... B62D 5/0472
(Continued)

FOREIGN PATENT DOCUMENTS

JP    H 03-45452 A    2/1991
JP    2001-063327 A   3/2001
(Continued)

Primary Examiner — Thomas G Black
Assistant Examiner — Demetra R Smith-Stewart
(74) Attorney, Agent, or Firm — Morgan, Lewis & Bockius LLP

(57) ABSTRACT

A speed limiting device may include a communicator configured to communicate with a tire air pressure monitor, a steering angle detector, a yaw rate detector and an engine controller of a vehicle; a storage configured to store limited speed information corresponding to slip information, in a form of a table; and a controller configured to acquire slip information based on a steering angle detected by the steering angle detector and a yaw rate detected by the yaw rate detector when abnormality information is received from the tire air pressure monitor, to check a limited speed corresponding to the acquired slip information, and to output the checked limited speed to the engine controller.

19 Claims, 11 Drawing Sheets

(56) References Cited

U.S. PATENT DOCUMENTS

2002/0032513 A1* 3/2002 Faye .................. B60C 23/0408
  701/93
2004/0267493 A1 12/2004 Pinard et al.
2010/0174437 A1* 7/2010 Benedict .............. B60T 8/1725
  701/31.4

FOREIGN PATENT DOCUMENTS

| | | |
|---|---|---|
| JP | 2002-317679 A | 10/2002 |
| JP | 2002-240688 A | 8/2004 |
| JP | 2006-001298 A | 1/2006 |
| JP | 2006-011981 A | 1/2006 |
| JP | 2008-149742 A | 7/2008 |
| KR | 10-0273782 B1 | 12/2000 |
| KR | 10-2012-0010591 A | 2/2012 |
| KR | 10-1334233 B1 | 11/2013 |
| KR | 10-2015-0125348 A | 11/2015 |

* cited by examiner

FIG. 4

| ABNORMALITY | SLIP INFORMATION (DIFFERENCE VALUE) | LIMITED SPEED INFORMATION |
|---|---|---|
| NON-PRESENCE | – | – |
| PRESENCE | LESS THAN C1 | 120 kph |
| PRESENCE | C1 OR MORE BUT LESS THAN C2 | 110 kph |
| PRESENCE | C2 OR MORE BUT LESS THAN C3 | 100 kph |
| PRESENCE | C3 OR MORE | 90 kph |

FIG. 5

| ABNORMALITY | SLIP INFORMATION (DIFFERENCE VALUE) | LIMITED SPEED INFORMATION 1 | LIMITED SPEED INFORMATION 2 | LIMITED SPEED INFORMATION 3 |
|---|---|---|---|---|
| NON-PRESENCE | – | – | – | – |
| PRESENCE | LESS THAN C1 | 120 kph | 118 kph | 116 kph |
| PRESENCE | C1 OR MORE BUT LESS THAN C2 | 110 kph | 108 kph | 106 kph |
| PRESENCE | C2 OR MORE BUT LESS THAN C3 | 100 kph | 98 kph | 96 kph |
| PRESENCE | C3 OR MORE | 90 kph | 88 kph | 86 kph |

FIG. 9

| ABNORMALITY | SLIP INFORMATION (DIFFERENCE VALUE) | LIMITED SPEED INFORMATION |
|---|---|---|
| NON-PRESENCE | – | – |
| PRESENCE | LESS THAN C1 | 125 kph |
| PRESENCE | C1 OR MORE BUT LESS THAN C2 | 110 kph |
| PRESENCE | C2 OR MORE BUT LESS THAN C3 | 95 kph |
| PRESENCE | C3 OR MORE | 80 kph |

SPEED LIMITING DEVICE, VEHICLE HAVING THE SAME AND METHOD FOR CONTROLLING THE SAME

CROSS-REFERENCE TO RELATED APPLICATION(S)

The present application claims priority to Korean Patent Application No. 10-2016-0121660 filed on Sep. 22, 2016, the entire contents of which is incorporated herein for all purposes by this reference.

BACKGROUND OF THE INVENTION

Field of the Invention

The present invention relates to a speed limiting device configured for limiting a speed when a slip occurs, a vehicle having the same and a method for controlling the same.

Description of Related Art

A vehicle is a machine configured to move on the road by driving vehicle wheels, and includes an engine, a power transmission system receiving power of engine to transmit the power to the vehicle wheels, a steering system regulating a driving direction of the vehicle, and a suspension system preventing a shock of the road from being delivered to the vehicle during driving.

The vehicle may ensure the driving force, the driving safety and the riding comfort by maintain an air pressure of a tire of the vehicle wheel in a reference air pressure.

However, as for a vehicle in a conventional manner, when an air pressure of a tire is reduced under a reference air pressure due to an external environment or funk, a vehicle wheel may not function properly and thus the riding comfort and the driving force may be reduced and the driving safety also may be reduced. In addition, since the fuel consumption is increased, the fuel economy may be decreased and the life of the tires may be reduced.

When the difference occurs in the air pressure of the tire of the vehicle wheel during driving, the driving safety may be extremely reduced and it may cause the accident.

As for the vehicle in the conventional manner, when the air pressure of the tire of the vehicle wheel is out of the reference range, i.e., the air pressure is too high or too low, a slip may occur between the tire and the road and thus it may cause a major accident. In addition, the riding comfort and the braking force of the vehicle may be greatly reduced.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a speed limiting device configured for limiting a speed of a vehicle based on information related to a steering angle and a yaw rate when tire monitoring information is abnormality information, a vehicle having the same and a method for controlling the same.

It is another aspect of the present invention to provide a speed limiting device configured for changing limited speed information corresponding to information related to a steering angle and a yaw rate based on replaced tire information, a vehicle having the same and a method for controlling the same.

Additional aspects of the present invention will be set forth in part in the description which follows and, in part, will be obvious from the description, or may be learned by practice of the present invention.

In accordance with one aspect of the present invention, a speed limiting device may include a communicator configured to communicate with a tire air pressure monitor, a steering angle detector, a yaw rate detector and an engine controller of a vehicle; a storage configured to store limited speed information corresponding to slip information, in a form of a table; and a controller configured to acquire slip information based on a steering angle detected by the steering angle detector and a yaw rate detected by the yaw rate detector when abnormality information is received from the tire air pressure monitor, to check a limited speed corresponding to the acquired slip information, and to output the checked limited speed to the engine controller.

The table of the storage has vehicle information and tire information.

The communicator communicates with an external server and the controller updates information stored in the storage by receiving a new table from the server.

The communicator communicates with an external terminal and the controller receives tire information that is input via the terminal, determines whether a table having the received tire information is present by searching the storage, or asks the table having the tire information to the server.

In accordance with another aspect of the present invention, a vehicle may include a chassis to which a vehicle wheel and a steering wheel are connected; a tire air pressure monitor configured to monitor an air pressure of tire of the vehicle wheel; a steering angle detector configured to detect a rotation angle of the steering wheel; a body connected to the chassis and configured to form an external; a yaw rate detector configured to detect a speed of changing a rotation angle of the body; and a speed limiting device configured to acquire slip information based on the detected steering angle and the detected yaw rate when abnormality information is received from the tire air pressure monitor, to check a limited speed corresponding to the acquired slip information, and to limit a drivable speed as the checked limited speed.

The speed limiting device stores limited speed information corresponding slip information, in a form of a table.

The speed limiting device adjusts the limited speed information related to the table based on a period of use and a driving distance of the tire.

The vehicle may further include a communicator configured to communicate with an external server, and wherein the speed limiting device receives a new table from the server and stores the received new table by classifying the table by corresponding to tire information.

A limited speed value of the limited speed information related to the table is more reduced as a slip angle in the slip information is increased.

The vehicle may further include a speed detector configured to detect a speed of the chassis; and an engine controller configured to control an engine so that the detected speed does not exceed the checked limited speed.

The engine controller checks the number of revolutions of the engine corresponding to the checked limited speed, and controls the engine so that the engine rotates equal to or less than the checked the number of revolutions.

When the abnormality information is received, the speed limiting device adjusts the checked limited speed by periodically acquiring slip information.

When the abnormality information is not received, the speed limiting device sets the drivable speed to a predetermined maximum speed.

In accordance with another aspect of the present invention, a vehicle may include a plurality of vehicle wheels including a wheel and a tire; a chassis to which the plurality of vehicle wheels and a steering wheel are connected; a wheel speed detector configured to detect a wheel speed of each of the plurality of vehicle wheels; a steering angle detector configured to detect a rotation angle of the steering wheel; a body connected to the chassis and configured to form an external: a yaw rate detector configured to detect a speed of changing a rotation angle of the body; and a speed limiting device configured to determine whether an air pressure of at least one tire is out of a reference range based on the detected plurality of wheel speed, to acquire slip information based on the detected steering angle and the detected yaw rate when the air pressure of at least one tire is out of the reference range and to check a limited speed corresponding to the acquired slip information, and to limit a drivable speed as the checked limited speed.

The speed limiting device stores limited speed information corresponding to slip information, in a form of a table, wherein a limited speed value of the limited speed information related to the table is more reduced as a slip angle in the slip information is increased.

An engine controller configured to determine a vehicle speed based on the detected plurality of wheel speed, and to control an engine so that the determined vehicle speed does not exceed the checked limited speed.

In accordance with another aspect of the present invention, a method for controlling vehicle including a steering angle detector and a yaw rate detector, may include checking a steering angle detected by the steering angle detector and a yaw rate detected by the yaw rate detector when abnormality information related to tire air pressure is generated; acquiring slip information based on the detected steering angle and the detected yaw rate; checking a limited speed corresponding to the acquired slip information; limiting a drivable speed of the vehicle as the checked limited speed; and setting the drivable speed of the vehicle to a predetermined maximum speed when the abnormality information related to tire air pressure is not generated.

The checking the limited speed includes checking a pre-stored table, wherein the table includes limited speed information corresponding to slip information.

The method may further include checking whether the abnormality information related to tire air pressure is received from a tire air pressure monitor.

The method may further include checking whether a lamp indicating that tire air pressure is abnormal is turned on.

The limiting a drivable speed of the vehicle as the checked limited speed includes detecting a speed of the vehicle and controlling the number of revolution of an engine so that the detected speed does not exceed the checked limited speed.

The method may further include adjusting the checked limited speed by acquiring periodically the slip information when the abnormality information related to tire air pressure is generated.

The limiting a drivable speed of the vehicle as the checked limited speed includes checking a degree of opening of a throttle valve corresponding to the checked limited speed and controlling the throttle valve so that a degree of opening of the throttle valve is equal to or less then the checked degree of opening.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 4 and FIG. 5 are an exemplary view of table stored in the vehicle in accordance with an exemplary embodiment of the present invention.

FIG. 9 is an exemplary view of table stored in the vehicle in accordance with another exemplary embodiment of the present invention.

Figure 1:
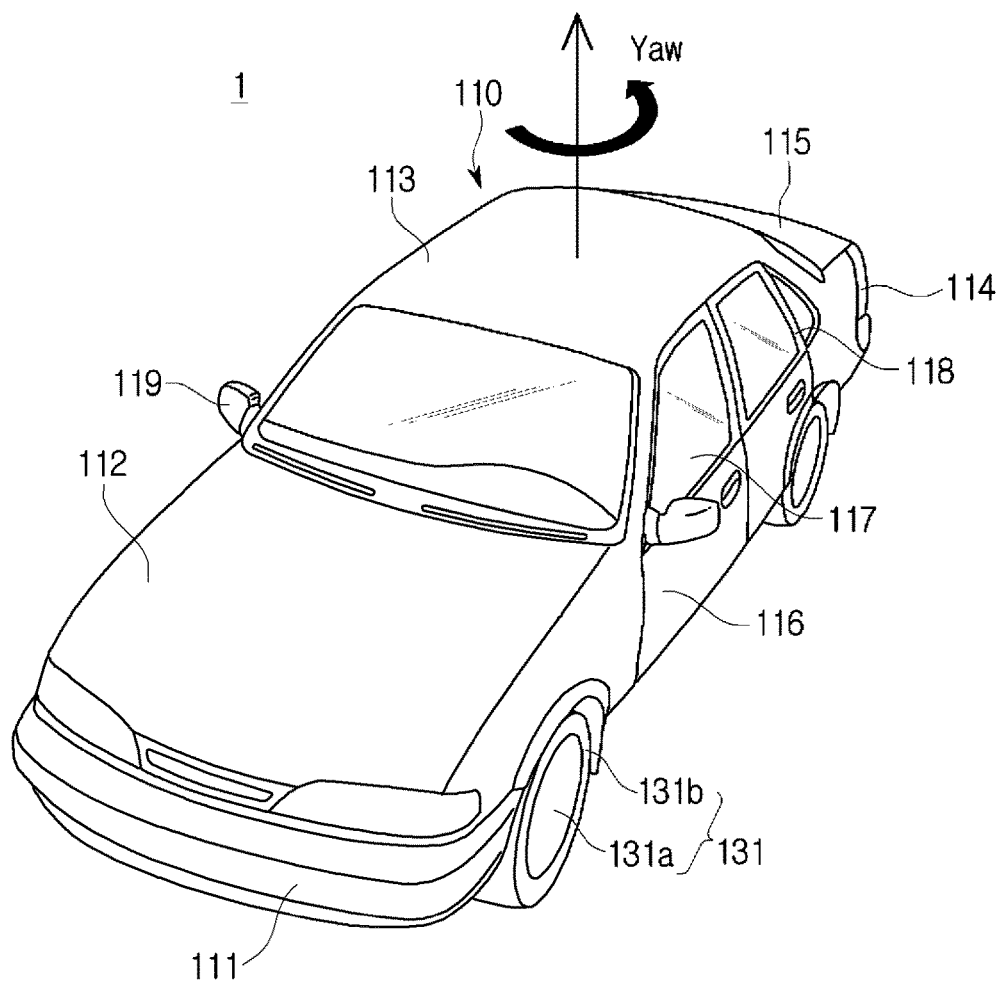
FIG. 1 is an exemplary view of an external of a vehicle in accordance with an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present application will be described more fully hereinafter with reference to the accompanying drawings, in which exemplary embodiments of the disclosure are shown.

Figure 2:
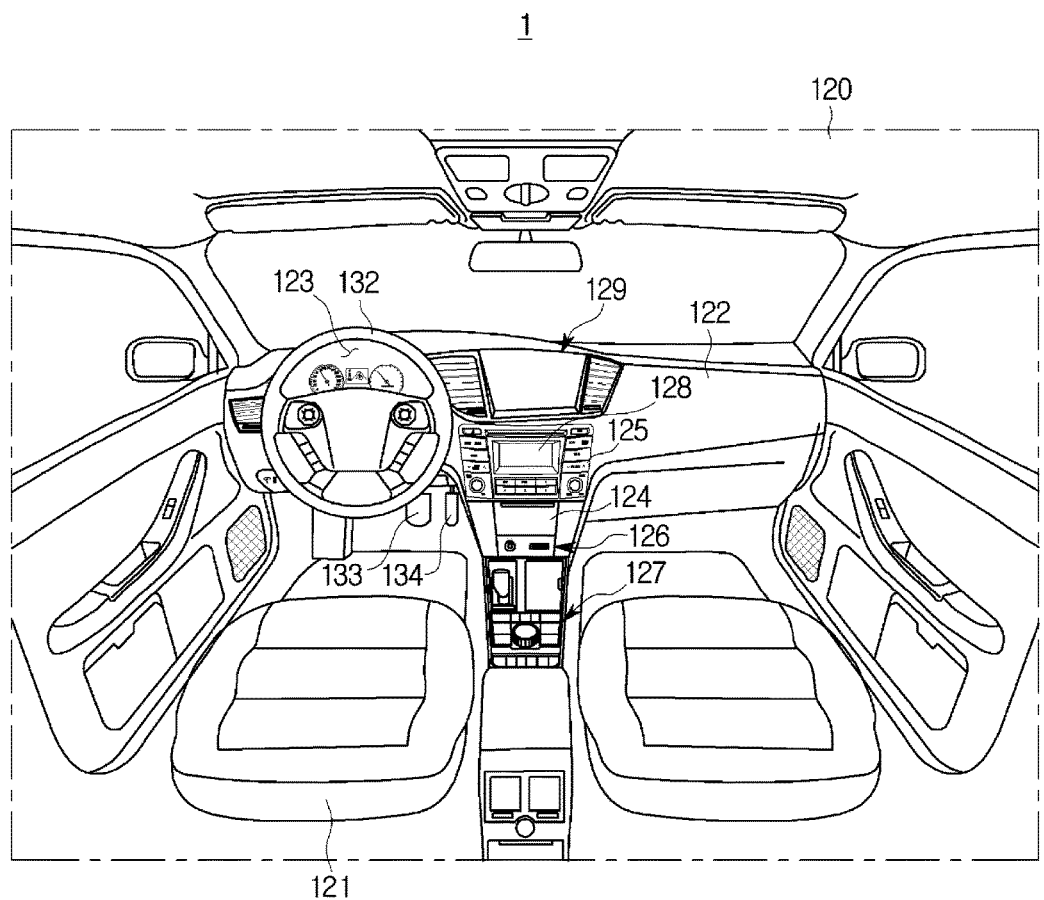
FIG. 2 is an exemplary view of an internal of the vehicle in accordance with an exemplary embodiment of the present invention.

FIG. 1 is an exemplary view of an external of a vehicle in accordance with an exemplary embodiment of the present invention and FIG. 2 is an exemplary view of an internal of the vehicle in accordance with an exemplary embodiment of the present invention.

A vehicle 1 may include a body having an internal and an external, and a chassis which is the rest of the vehicle aside from the body, and in which a mechanical apparatus is disposed for the driving.

As illustrated in FIG. 1, an external 110 of the body may include a front panel 111, a bonnet 112, a roof panel 113, a rear panel 114, a trunk 115, a front, rear, left, and right door 116, and a window glass 117 provided in the front, rear, left, and right door 116 to be openable.

The external of the body may further include a pillar 118 provided in the boundary between the front panel, the bonnet, the roof panel, the rear panel, the trunk, and window glasses of the front, rear, left, and right door, and a side mirror 119 providing a view of the rear side of the vehicle 1 to a driver.

As illustrated in FIG. 2, the internal 120 of the body may include a seat 121 on which a passenger is seated, a dashboard 122, an instrument panel that is a cluster, 123, and a center fascia 124 in which an operation panel and an outlet of the air conditioning device, and the audio device are disposed, wherein the instrument panel 123 may be disposed on the dashboard and may include tachometer, speedometer, coolant temperature indicator, fuel indicator, turn signal indicator, high beam indicator light, warning lights, seat belt warning light, trip odometer, odometer, automatic transmission selector lever indicator, door open warning light, engine oil warning light, and a low fuel warning light.

In the center fascia 124, a head device 125 configured to control the audio device, the air conditioning device and a heater and a multi-terminal 126 for connection with an external terminal may be disposed.

The multi-terminal 126 may be disposed adjacent to the head device 125, and may include a USB port, an AUX terminal, and a SD slot.

The vehicle 1 may further include an input 127 configured to receive an operation command of a variety of functions and a display 128 configured to display operation information related to the variety of functions and information input from a user.

The input 127 may include at least one physical button, e.g., On/Off button for the variety of functions and a button to change a set value of the variety of functions.

The input 127 may further include a jog dial or a touch pad to input a command for moving cursor and selecting cursor, wherein the cursor is displayed on a display of a vehicle terminal 129.

The jog dial or the touch pad may be provided in the center fascia.

The vehicle may further include the vehicle terminal 129 embedded or disposed to be stand on the dashboard.

The vehicle terminal 129 may include a display panel and a touch screen in which a touch panel is integrally formed with the display panel.

The vehicle terminal 129 may perform an audio function, a video function, a navigation function, a DMB function and a radio function, and may display an image of the front, rear, left and right side, and map information and route guide information during an autonomous driving mode.

When only the display panel is provided in the vehicle terminal 129, a button displayed on the vehicle terminal 129 may be selected by use of the input 127.

The vehicle terminal 129 may display information related to a function currently performed and information input from a user, and receive an input of information that is related to a replaced tire or display the information related to the replaced tire.

The chassis of the vehicle is a structure configured to support the body and may include a plurality of vehicle wheels 131, a steering wheel 132 of a steering system connected to the inside of the vehicle, a brake pedal 133 of a braking system, and an accelerator pedal 134 of a driving device.

The plurality of vehicle wheels 131 may be configured to perform a rotation to move the vehicle and may include a wheel 131a and a tire 131b.

The wheel 131a may support the vehicle by sharing an entire weight of the vehicle with the tire 131b, and perform a function of enduring a torque and a shock from a road surface when the vehicle drives and brakes, the centrifugal force when the vehicle turns, and a force in a lateral side when the vehicle is inclined.

A wheel speed detector may be provided in the wheel 131a to detect a rotation speed of the wheel.

The tire 131b may be integrally rotated with the wheel 131a by being inserted into the wheel 131a, and configured to absorb a shock from the surface when driving, and to minimize a slip with the road surface when braking, driving, and turning.

The performance of the tire 131b may vary according to the manufacturer and the model.

This because the size, the weight, the tread pattern and the content ratio of rubber, e.g., a tread rubber, a side wall and a bead part, a steel and a fabric may be different according to the manufacturer and the model.

An air pressure detector may be provided in the tire 131b to detect an internal air pressure of the tire 131b.

The steering wheel 132 may be a device configured to regulate a driving direction of the vehicle 1, and may include a rim held by a driver and a spoke connected to the steering device of the vehicle 1 and configured to connect the rim to a hub of a rotary axis (i.e. a steering axis) for the steering.

The brake pedal 133 may be a pedal pressed by a user according to a user's intention for braking.

The accelerator pedal 134 may be a pedal pressed by a user according to a user's intention for accelerating.

The accelerator pedal 134 may adjust the number of rotation of the engine by regulating an intake of mixture gas in a gasoline engine and fuel injection quantity in a diesel engine.

When using the gasoline engine, the accelerator pedal 134 may further include a throttle valve regulating an air amount passing through a carburetor or a throttle body.

The accelerator pedal 134 may regulate a degree of opening of the throttle valve.

The chassis of the vehicle may further include a power generation device, a power transmission device, a steering system, a brake system, a suspension device, a transmission device, and a driving device configured to apply the driving force and the braking force to the front, rear, left and right vehicle wheels The power generation device may include an engine, a fuel device, a cooling and fuelling device and an electric device.

The vehicle may further include a variety of safety devices for a driver and passenger safe.

The safety devices of the vehicle may include a variety of safety devices including an airbag control device for the safety of the driver and passenger when the collision of the vehicle, an Electronic Stability Control (ESC) configured to maintain the stability of the vehicle when accelerating or cornering, and a tire-pressure monitoring system (TPMS).

The vehicle 1 may include an Electronic Control Unit (ECU) configured to control the operation of the driving device, the various safety devices and the detectors.

In the inside of the vehicle 1, an electronic devices including a hand-free device, a GPS, an audio device, a Bluetooth device, a rear camera, a device for charging terminal device, and a high-pass device may be disposed for the convenience of the driver.

The vehicle 1 may further include an ignition button configured to input an operation command to an ignition motor.

The vehicle 1 may operate an ignition motor or when the ignition button is turned on, and drive the engine that is the power generation device by the operation of the ignition motor.

The vehicle 1 may further include a battery configured to supply driving force by being electrically connected to the terminal, the audio device, an internal light, the ignition motor and other electronic devices.

The battery may perform a charging by use of a generator itself or the power of the engine during driving.

Figure 3:
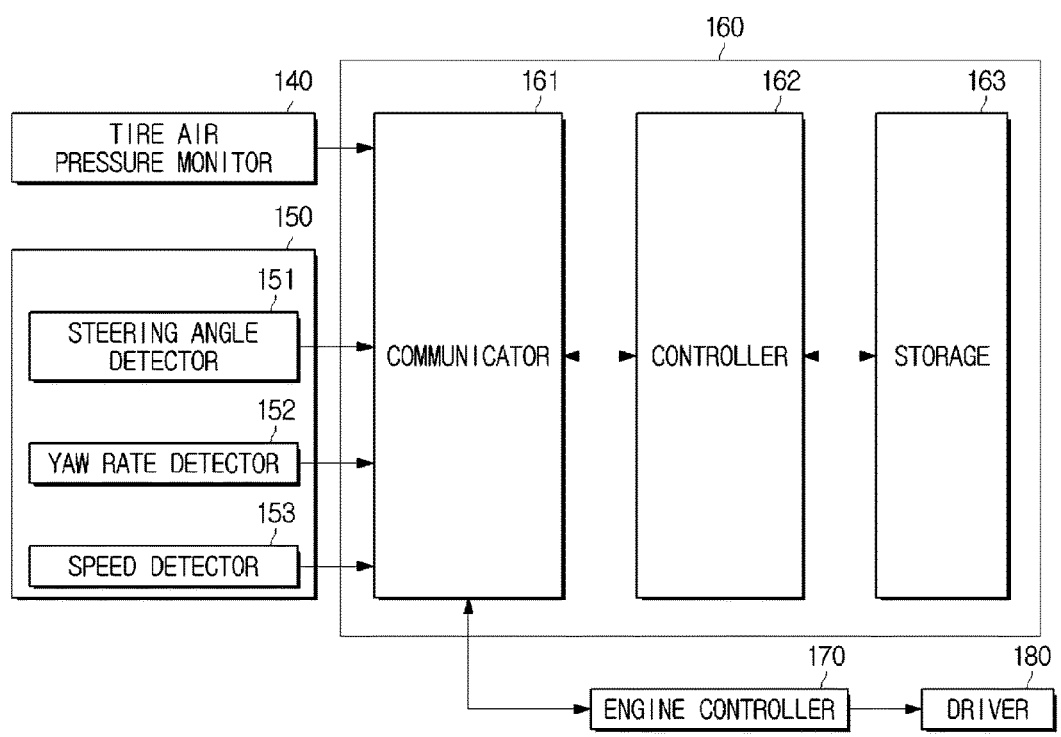
FIG. 3 is a control block diagram illustrating the vehicle in accordance with an exemplary embodiment of the present invention.

FIG. 3 is a control block diagram illustrating the vehicle in accordance with an exemplary embodiment of the present invention.

The vehicle 1 may include a tire air pressure monitor 140, a detector 150, a speed limiting device 160, an engine controller 170, and a driver 180.

The tire air pressure monitor 140 may include an air pressure detector detecting an internal pressure of the tire of each of the vehicle wheel.

The tire air pressure monitor 140 may determine whether a tire that is out of a reference range is present by comparing the detected air pressure of each tire with the reference range.

When it is determined that at least one tire is out of the reference range, the tire air pressure monitor 140 may transmit information related to the tire, which is out of the reference range, to the display.

The tire information transmitted to the display may include a position of the tire and information related to the tire air pressure.

The information related to the tire air pressure may represent information related to abnormality of tire air pressure (hereinafter referred to as "abnormality information") and include warning information or notice information according to the air pressure.

In addition, the display may include at least one display of a display provided in the cluster 123, a display provided in the head device 124, and a display of the vehicle terminal 129.

The reference range may include an air pressure between a minimum air pressure of the tire and a maximum air pressure of the tire that is required for the driving safety of the vehicle.

The tire air pressure monitor 140 may output the abnormality information related to tire air pressure to the speed limiting device 160.

The detector 150 may be a detector configured to detect a slip of the vehicle, and include a steering angle detector 151 configured to detect a rotation angle of the steering wheel 132 and a yaw rate detector 152 configured to detect a speed of changing a rotation angle of the body.

The detector 150 may further include a speed detector 153 to detect a speed of the vehicle (i.e., the vehicle speed).

The speed detector 153 may include at least one of a plurality of wheel speed detectors configured to detect a rotation speed of a plurality of wheels or an acceleration detector configured to detect an acceleration of the vehicle.

The speed limiting device 160 may limit the speed of the vehicle based on the tire air pressure, the steering angle and the yaw rate of the vehicle.

The speed limiting device 160 may include a communicator 161, a controller 162, and a storage 163.

The communicator 161 may communicate with the tire air pressure monitor 140, the detector 150 and the engine controller 170.

The communicator 161 may communicate with the tire air pressure monitor 140, the detector 150, and the engine controller 170 via a Controller Area Network (CAN) communication technology or a wireless communication technology.

In addition, the communicator 161 may communicate with devices placed in the vehicle via a variety of communication technologies, e.g., LIN, MOST, FLEXRAY, AUTOSAR, MUX, and LAN.

The controller 162 may set a drivable speed to a predetermined maximum speed when the abnormality information is not received from the tire air pressure monitor 140.

When receiving the abnormality information from the tire air pressure monitor 140, the controller 162 may check a steering angle detected by the steering angle detector 151 and a yaw rate detected by the yaw rate detector 152, acquire slip information based on the detected steering angle and the detected yaw rate, and check a limited speed corresponding to the acquired slip information.

The controller 162 may receive a yaw rate that is detected by a certain time interval, by a certain number of times, equalize the yaw rate that is detected by the certain number of times, acquire a turning angle by dividing the equalized yaw rate by the certain time, and acquire a difference value between the wheel angle and the turning angle by comparing the wheel angle corresponding to the information related to the steering angle with the acquired turning angle.

The difference value between the wheel angle and the turning angle may correspond to slip information related to the vehicle.

The slip information may include information related to whether the vehicle is slipped or not and information related to a slip angle.

The controller 162 may confirm a limited speed corresponding to the acquired difference value in a table.

The controller 162 may transmit the confirmed limited speed to the engine controller 170.

When receiving the abnormality information from the tire air pressure monitor 140, the controller 162 may periodically acquire slip information and adjust the confirmed limited speed based on the acquired slip information.

The controller 162 may change a limited speed corresponding to the slip information based on a driving distance and an expiration date of the tire. This is because the tire more deteriorated as the driving distance increases and a period of use of the tire increases.

The controller 162 may check the number of revolutions of the engine or a degree of opening of the throttle valve corresponding to the limited speed and transmit the checked number of revolutions of the engine or the checked degree of opening of the throttle valve to the engine controller 170.

The storage 163 may store information related to the limited speed corresponding to the slip information in a form of a table.

The slip information may include a slip angle corresponding to a difference value between a wheel angle and a turning angle.

As illustrated in FIG. 4, a table may include slip information having a plurality of difference values and limited speed information having a limited speed value corresponding to each of the plurality of difference values.

The limited speed value may be more reduced as the difference value between the turning angle and the wheel angle is increased.

The table may further include abnormality information related to the tire and the table may include slip information and limited speed information related to when the abnormality information is "presence", and exclude slip information and limited speed information related to when the abnormality information is "non-presence".

As illustrated in FIG. 5, a table may include slip information having a plurality of difference values and a plurality of pieces of limited speed information having a limited speed value matched with each of the plurality of difference values.

The plurality of pieces of limited speed information may be classified according to deterioration information related to the tire.

For example, as for the table, the plurality of pieces of limited speed information may include limited information 1 corresponding to a first step of deterioration, limited information 2 corresponding to a second step of deterioration, and limited information 3 corresponding to a third step of deterioration.

The limited speed value matched with each of the plurality of difference values may have a lower value as the step of deterioration is higher.

The deterioration information related to the tire may be determined based on a driving distance of the vehicle and a period of use from a point of time when a tire is replaced.

The storage 163 may further include vehicle information and tire information corresponding to the table stored in advance.

The vehicle information may include model and the weight of the vehicle.

The tire information may include at least one of the manufacturer, the model, the size, the weight of the tire and the content ratio of rubber, e.g., a tread rubber, a side wall and a bead part, a steel and a fabric.

The storage 163 may store each table by corresponding to each piece of information related to the tire by considering the fact that the performance of the tire is different from each other according to the tire information.

Information related to the table stored in the storage 163 may be acquired by experiments when manufacturing the vehicle. The information may be different from each other by corresponding to the vehicle and the tire.

The engine controller 170 may be a device configured to control the number of revolutions of the engine, and when the limited speed is received from the speed limiting device 160, the engine controller 170 may check the number of revolutions corresponding to the received limited speed and control the engine so that the engine rotates under the checked number of revolutions.

Accordingly, the engine controller 170 may allow the speed of the vehicle to not exceed the speed limit.

When the limited speed is received from the speed limiting device 160, the engine control unit (ECU) 170 may check the degree of the opening of the throttle valve corresponding to the received limited speed and allow the throttle valve to be opened under the checked degree of the opening.

When the limited speed is received from the speed limiting device 160, the engine control unit (ECU) 170 may check the number of revolutions corresponding to the received limited speed and check the degree of the opening of the throttle corresponding to the checked number of revolutions.

That is, the engine controller 170 may allow the engine to be driven by use of air introduced through the throttle valve that is opened under the checked degree of the opening, to prevent the engine from being over-rotated when pressing the accelerator pedal.

The driver 180 may drive the engine based on a command of the engine controller 170.

The driver 180 may drive the engine based on the command of the engine controller 170 and the driver 180 may drive the engine after opening the throttle valve under the checked degree of the opening.

As described above, according to the embodiment, by outputting the abnormality information related to the tire when the air pressure of vehicle wheel of at least one tire is out of the reference range and by limiting a driving speed when a side-slip occurs in a state in which the air pressure of vehicle wheel of at least one tire is out of the reference range, it may be possible to prevent accidents caused by an excessive slip by pressing the accelerator pedal instead of the brake pedal, which is due to a driver' incorrect operation in the case of the emergency.

Figure 6:
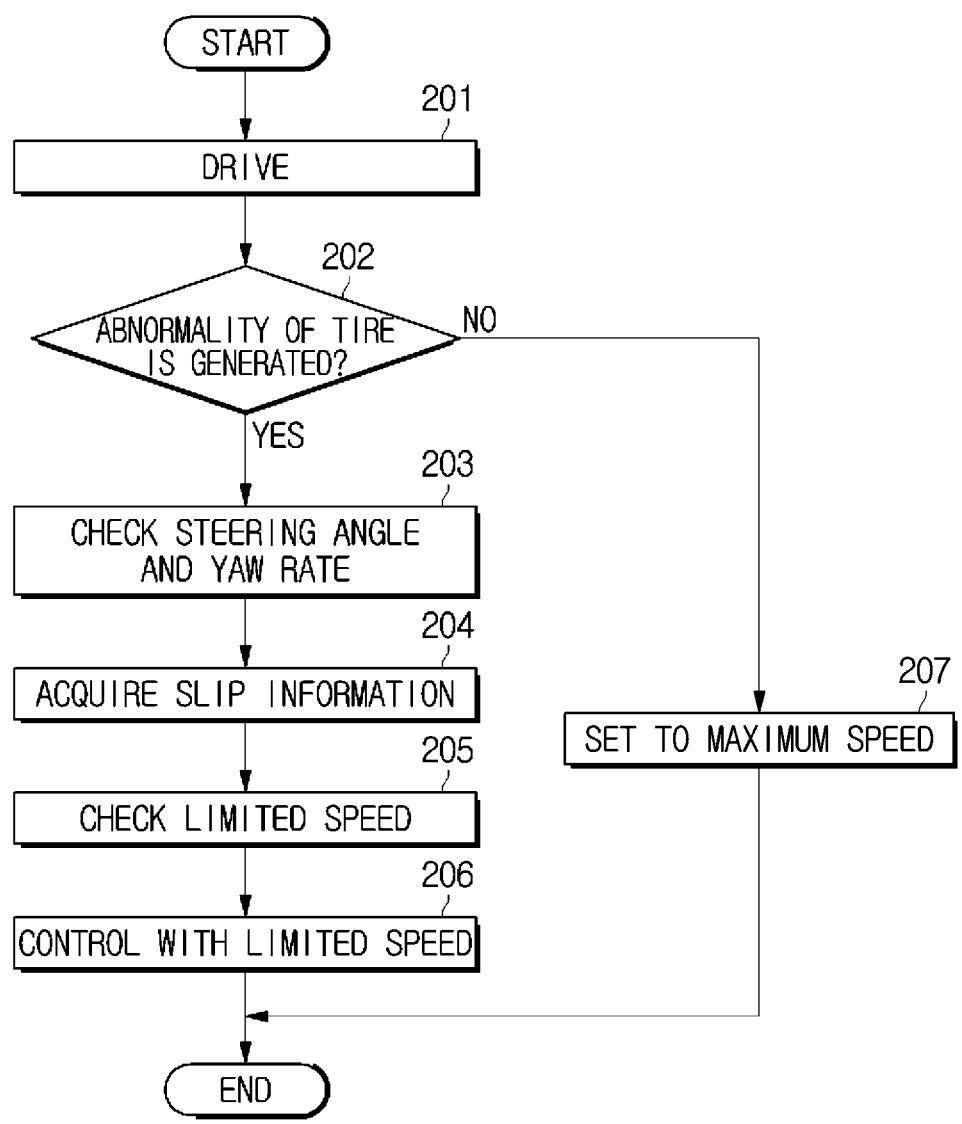
FIG. 6 is a flowchart illustrating a control of the vehicle in accordance with an embodiment.

FIG. 6 is a flowchart illustrating a control of the vehicle in accordance with an embodiment.

When the ignition of the vehicle is turned on and the gear lever is placed in a drive (D), the vehicle may perform a driving (201).

The vehicle may detect an internal air pressure of the tire of each vehicle wheel by use of the air pressure detector that is placed in the each vehicle wheel, and determine whether a tire that is out of the reference range is present by comparing the detected air pressure of the tire with the reference range. When it is determined that the air pressure of at least one tire is out of the reference range, the vehicle may display information related to the tire that is out of the reference range, on the display.

The display may include at least one display of the display provided in the cluster 123, the display provided in the head device 124, and the display of the vehicle terminal 129.

When it is determined that the abnormality information related to the air pressure of the tire is generated (202), the vehicle may check a steering angle detected by the steering angle detector 151 and a yaw rate detected by the yaw rate detector 152 (203), acquire slip information based on the detected steering angle and the detected yaw rate (204), and check a limited speed corresponding to the acquired slip information (205).

A configuration to acquire the slip information will be described in details in the following.

The vehicle may check a yaw rate that is detected by a certain time interval, by a certain number of times, equalize the yaw rate that is detected by the certain number of times, and acquire a turning angle by dividing the equalized yaw rate by the certain time.

The vehicle may acquire a difference value between the wheel angle and the turning angle by comparing the wheel angle corresponding to the steering angle information with the acquired turning angle.

The vehicle may determine whether the vehicle is slipped, based on the acquired difference value and also the vehicle may acquire a slip angle of the vehicle.

The vehicle may check a limited speed corresponding to the acquired slip angle in a pre-stored table.

The vehicle may check the number of revolutions corresponding to the checked limited speed, and control the engine so that the engine is rotated under the checked number of revolutions. Accordingly, the vehicle may control the speed of the vehicle so that the speed of the vehicle does not exceed the limited speed (206).

When the vehicle uses the gasoline, the vehicle may check the degree of the opening of the throttle valve corresponding to the limited speed and allow the throttle valve to be opened under the checked degree of the opening.

Therefore, the vehicle may allow the engine to be driven by use of air introduced through the throttle valve that is opened under the checked degree of the opening, to prevent the engine from being over-rotated, which is rotated to exceed the checked number of revolutions, when pressing the accelerator pedal The vehicle may periodically acquire the slip information from when an abnormality is generated in the air pressure of the tire, and adjust the acquired limited speed based on the acquired slip information.

When it is determined that the abnormality information related to the air pressure of the tire is not generated, the vehicle may set a drivable speed to a predetermined maximum speed (207).

That is, the vehicle is configured to increase the speed of the vehicle by operating the engine by pressing the accelerator pedal, and in this time, the vehicle may increase the speed thereof until the predetermined maximum speed.

Figure 7:
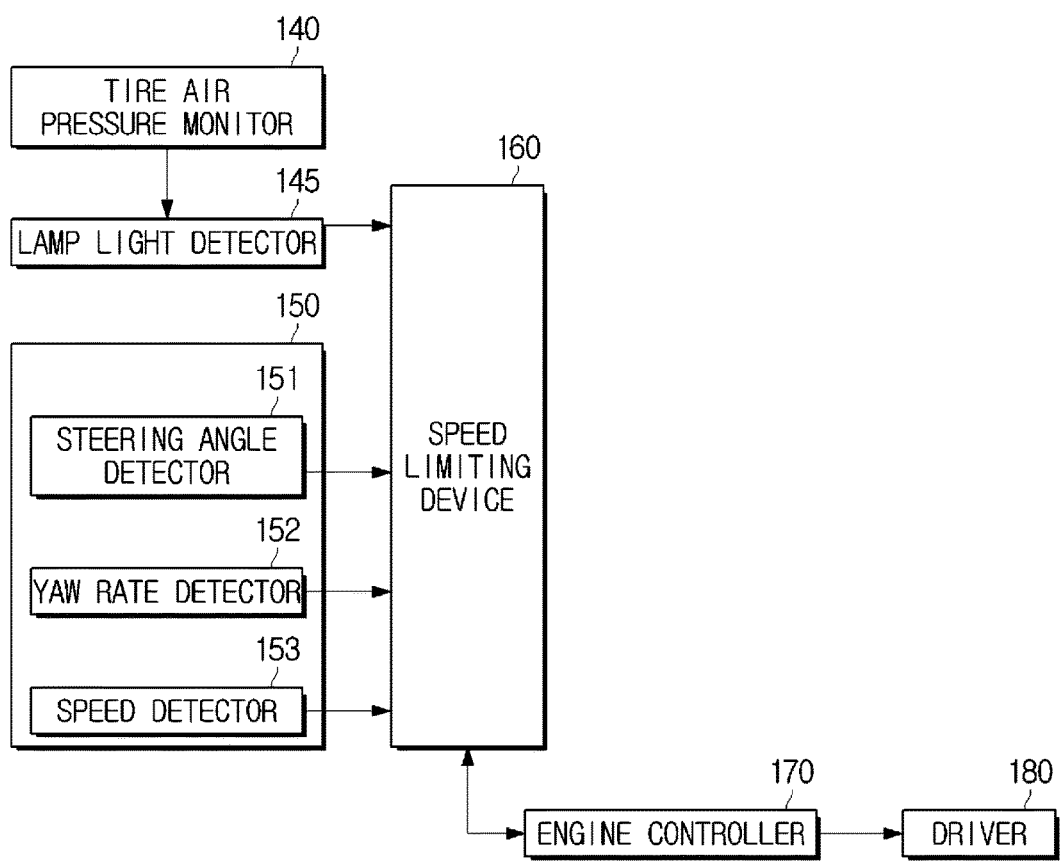
FIG. 7 is a control block diagram illustrating a vehicle in accordance with another exemplary embodiment of the present invention.

FIG. 7 is a control block diagram illustrating a vehicle in accordance with another exemplary embodiment of the present invention, and the vehicle may further include a lamp light detector.

According to another exemplary embodiment, a vehicle may include a tire air pressure monitor 140, a lamp light detector 145, a detector 150, a speed limiting device 160, an engine controller 170 and a driver 180.

The tire air pressure monitor 140 may further include a lamp configured to be turned on when the abnormality information related to the tire is generated.

The lamp light detector 145 may detect whether the lamp is turned on or off, and transmit a lamp signal to the speed limiting device 160.

For example, the lamp light detector 145 may detect a high signal caused by turning on the lamp, and may transmit the detected high signal to the speed limiting device 160.

When the signal related to turning on the lamp is received from the lamp light detector 145, the speed limiting device 160 may acquire slip information related to the vehicle and check a limited speed corresponding to the acquired slip information. A configuration for acquiring the slip information and checking the limited speed corresponding to the acquired slip information is the same as the configuration according to an embodiment, and thus a description thereof will be omitted.

Figure 8:
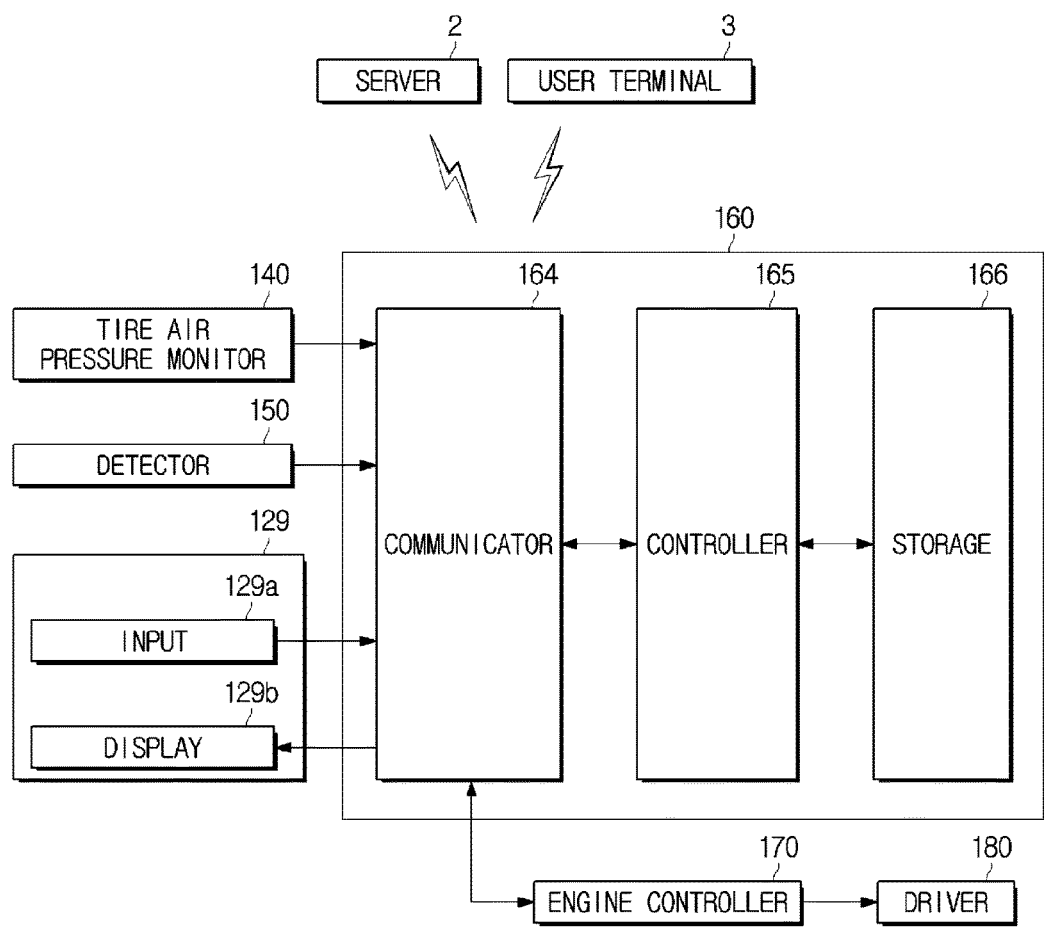
FIG. 8 is a control block diagram illustrating a vehicle in accordance with another exemplary embodiment of the present invention.

FIG. 8 is a control block diagram illustrating a vehicle in accordance with another exemplary embodiment of the present invention.

According to another exemplary embodiment, a vehicle may include a vehicle terminal 129, a tire air pressure monitor 140, a detector 150, a speed limiting device 160, an engine controller 170 and a driver 180, and the vehicle may communicate with at least one of an external sever 2 and a user terminal 3.

The tire air pressure monitor 140, the detector 150, the speed limiting device 160, the engine controller 170 and the driver 180 provided in the vehicle according to another exemplary embodiment may be the same as those according to an exemplary embodiment and thus a description thereof will be omitted.

The vehicle terminal 129 may include an input 129*a* receiving information and a display 129*b* displaying information.

When the tire is replaced, the vehicle terminal 129 may receive information related to a replaced tire and transmit the input tire information to the speed limiting device 160.

The tire information may include at least one of the manufacturer, the model, the size, the weight and the tread pattern of the tire.

When the abnormality information related to the tire is received, the speed limiting device 160 may acquire slip information related to the vehicle and check a limited speed corresponding to the acquired slip information. A configuration for acquiring the slip information and checking the limited speed corresponding to the acquired slip information is the same as the configuration according to an embodiment, and thus a description thereof will be omitted.

An additional configuration of the speed control device will be described.

The speed limiting device 160 may include a communicator 164, a controller 165 and a storage 166.

The communicator 164 may communicate with at least one of the external sever 2 and the user terminal 3 via a wired and/or wireless communication method.

The communicator 164 may perform only internal communication in the vehicle.

In the instant case, the communicator 164 may communicate with a communication module provided in the vehicle.

The communication module provided in the vehicle may communicate with at least one of the external sever 2 and the user terminal 3 via the wired and/or wireless communication method.

When the tire is replaced, the communicator 164 may receive information related to a replaced tire from the external sever 2 and the user terminal 3 and transmit the received tire information to the controller 165.

When the tire information is received, the controller 165 may check whether a table having the received tire information is stored in the storage 166, and when the table having the received tire information is stored in the storage 166, the controller 165 may check a limited speed corresponding to the slip information related to the vehicle by use of the table having the received tire information and control a speed of the vehicle by use of the checked limited speed.

When it is determined that the table having the received tire information is not stored in the storage 166, the controller 165 may ask the table having the received tire information to the external server 2.

When it is determined that the table having the received tire information is not stored in the storage 166, the controller 165 may check whether the user terminal 3 is connected to the multi terminal of the vehicle and when it is determined that the user terminal 3 is connected to the multi terminal of the vehicle, the controller 165 may ask the table having the received tire information to the user terminal 3.

When the table having the information related to the replaced tire is received from the external sever 2 or the user terminal 3, the controller 165 may store the received table.

That is, the controller 165 may update information in the storage 166.

The controller 165 may acquire deterioration information related to the replaced tire by counting a driving distance of the vehicle and a period of use from a point of time when the tire is replaced and adjust the limited speed matched with the degree of the slip based on the acquired deterioration information.

The storage 166 may store a table by corresponding to the each tire information.

The storage 166 may store the information related to the replaced tire and the table, which are matched with each other.

As illustrated in FIG. 9, as for the table of the replaced tire, since the slip of the vehicle is changed according to the performance of the replaced tire, the limited speed information corresponding to the slip information may vary.

The storage 166 may store information related to a server and a user terminal which are communicable with the vehicle.

Figure 10:
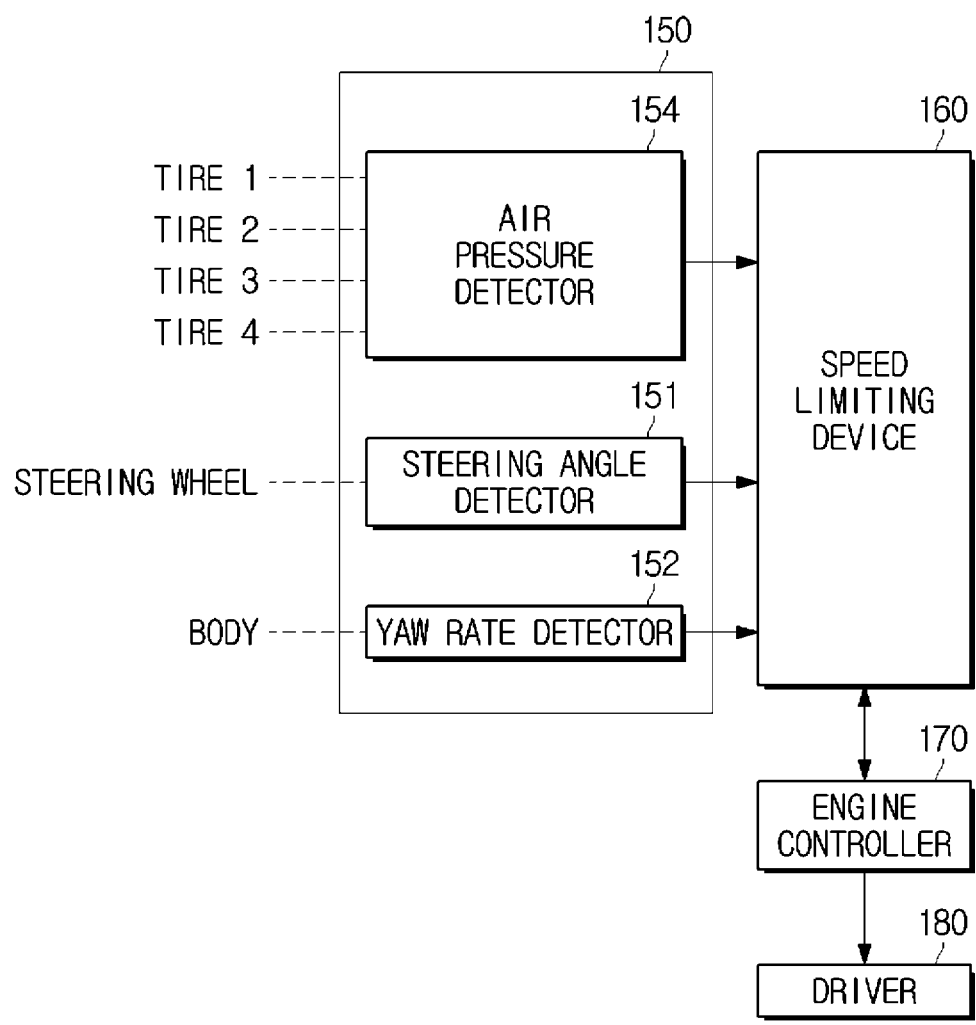
FIG. 10 is a control block diagram illustrating a vehicle in accordance with another exemplary embodiment of the present invention.

FIG. 10 is a control block diagram illustrating a vehicle in accordance with another exemplary embodiment of the present invention According to another exemplary embodiment, a vehicle may include a detector 150, a speed limiting device 160, an engine controller 170 and a driver 180.

The engine controller 170 and the driver 180 provided in the vehicle according to another exemplary embodiment may be the same as those according to an exemplary embodiment and thus a description thereof will be omitted.

The detector 150 may be a detector configured to detect an abnormality in the tire and a slip of the vehicle, and include a steering angle detector 151 configured to detect a rotation angle of the steering wheel 132, a yaw rate detector 152 configured to detect a speed of changing a rotation angle of the body and an air pressure detector 154 configured to detect an air pressure of tire of front, rear, left and right vehicle wheel.

The speed limiting device 160 may limit the speed of the vehicle based on the tire air pressure, the steering angle and the yaw rate of the vehicle.

The speed limiting device 160 may compare the detected air pressure of the each tire with the reference range and when the air pressure of at least one tire is out of the reference range, the speed limiting device 160 may check a steering angle detected by the steering angle detector 151 and a yaw rate detected by the yaw rate detector 152, acquire slip information based on the detected steering angle and the detected yaw rate, and check a limited speed corresponding to the acquired slip information.

The speed limiting device 160 may set a drivable speed to a predetermined maximum speed when the air pressure of at least one tire is within the reference range.

The speed limiting device 160 may compare the detected air pressure of the each tire with the reference range and when the air pressure of at least one tire is less than the reference range, the speed limiting device 160 may acquire slip information based on the detected steering angle and the detected yaw rate and check a limited speed corresponding to the acquired slip information.

The speed limiting device 160 may set a drivable speed to a predetermined maximum speed when the air pressure of at least one tire is equal to or greater than the reference range.

The storage 163 may store the reference range of the air pressure and the reference air pressure to determine whether the tire is abnormal, and store the limited speed information corresponding to the slip information in a form of a table.

The slip information may include the slip angle corresponding to a difference value between the wheel angle and the turning angle.

Figure 11:
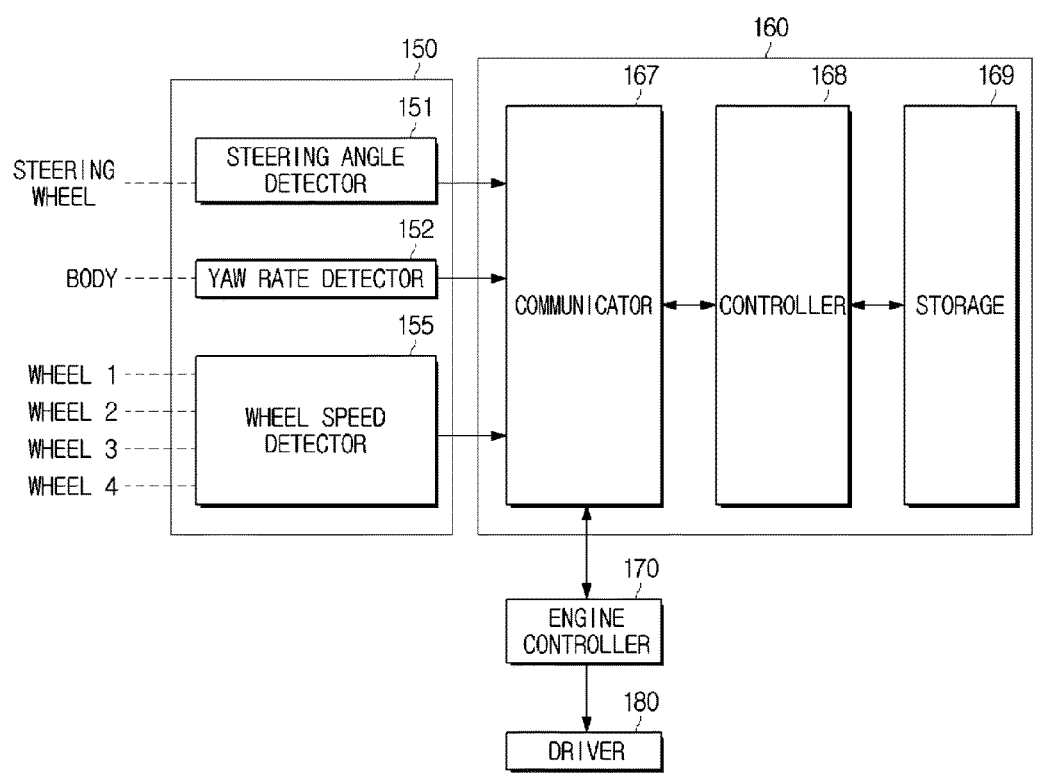
FIG. 11 is a control block diagram illustrating a vehicle in accordance with another exemplary embodiment of the present invention.

FIG. 11 is a control block diagram illustrating a vehicle in accordance with another exemplary embodiment of the present invention.

According to another exemplary embodiment, a vehicle may include a detector 150, a speed limiting device 160, an engine controller 170 and a driver 180.

The engine controller 170 and the driver 180 provided in the vehicle according to another exemplary embodiment may be the same as those according to an exemplary embodiment and thus a description thereof will be omitted.

The detector 150 may be a detector configured to detect an abnormality in the tire and a slip of the vehicle, and include a steering angle detector 151 configured to detect a rotation angle of the steering wheel 132, a yaw rate detector 152 configured to detect a speed of changing a rotation angle of the body, and a plurality of wheel speed detector 155 configured to detect a rotation speed of front, rear, left and right wheel.

The speed limiting device 160 may limit the speed of the vehicle based on the tire air pressure, the steering angle and the yaw rate of the vehicle.

The speed limiting device 160 may include a communicator 167, a controller 168 and a storage 169.

When the vehicle is in a tire air pressure monitoring mode, the controller 168 of the speed limiting device 160 may guide the steering wheel to be placed in the center and guide the vehicle to drive in a predetermined speed.

The speed limiting device 160 may output guide information via the display and the sound device.

When it is determined that the steering wheel is placed in the center based on the detected steering angle and the vehicle drives in the predetermined speed, the speed limiting device 160 may check a signal related to a wheel speed detected by the wheel speed detector during a certain time period.

The signal related to the wheel speed may include a pulse signal.

The controller 168 may detect a period value by analyzing the detected each pulse signal or analyze a pulse signal sequence. The controller 168 may compare a period value or a pulse signal sequence which are generated in a constant velocity portion in the air pressure of the tire in a normal state that is stored in the storage 169, with the detected pulse signal or the analyzed pulse signal sequence. Accordingly, the controller 168 may analyze whether the detected pulse signal or the analyzed pulse signal sequence is the same as the period value or the pulse signal sequence stored in the storage 169 or the detected pulse signal or the analyzed pulse signal sequence is in error range. Therefore, the controller 168 may determine whether the abnormality is present in the air pressure of the tire.

When it is determined that the abnormality is present in at least one of the air pressure of the tire, the controller 168 may check a steering angle detected by the steering angle detector 151 and a yaw rate detected by the yaw rate detector 152, acquire slip information based on the detected steering angle and the detected yaw rate, and check a limited speed corresponding to the acquired slip information.

The controller 168 may set a drivable speed to a predetermined maximum speed when the detected air pressure of the tire is normal.

The storage 169 may store a period value or a pulse signal sequence which are generated in an arbitrary constant velocity portion in the air pressure of the tire in a normal state, and store the limited speed information corresponding to the slip information in a form of the table.

As is apparent from the above description, according to the provided speed limiting device, vehicle having the same and method for controlling the same, it may secure the driving safety by limiting a driving speed of the vehicle when an air pressure of tire of at least one vehicle wheel is out of the reference range, and thus it may be possible to reduce the accident risk during driving, at a high speed.

In addition, by outputting the abnormality information related to the tire when the air pressure of at least one of tire of vehicle wheel is out of the reference range and by limiting a driving speed when a side-slip occurs in a state in which the air pressure of the at least one of tire of vehicle wheel is out of the reference range, it may be possible to prevent accidents caused by pressing the accelerator pedal instead of the brake pedal, which is due to a driver' incorrect operation in the case of the emergency.

It may be possible to secure the reliability of the limited speed information by setting the limited speed information for limiting the speed based on the real vehicle information and the real tire information, i.e., setting the limited speed information based on the actually measured reference corresponding to the vehicle type and the tire type, instead of the unified reference.

It may be possible to limit the speed of the vehicle in consideration of the characteristics of the replaced tire by changing the limited speed information in consideration of the characteristics of the replaced tire.

It may be possible to improve the quality of marketability of the speed limiting device and the vehicle having the same and further it may be possible to improve user satisfaction and to secure the competitiveness of the product.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A speed limiting device comprising:
    a communicator configured to communicate with a tire air pressure monitor, a steering angle detector, a yaw rate detector and an engine controller of a vehicle;
    a storage configured to store limited speed information corresponding to slip information, in a form of a table; and
    a controller configured to communicate with the communicator to receive at least one of a steering angle detected by the steering angle detector, a yaw rate detected by the yaw rate detector and abnormality information of the tire air pressure monitor, acquire the slip information based on a received steering angle and a received yaw rate detected when the abnormality information is received, to check a limited speed corresponding to the acquired slip information, and to output a control signal corresponding to at least one of a number of revolution of an engine and a degree of opening of a throttle valve to the engine controller through the communicator, so that a speed of the vehicle does not exceed the checked limited speed.

2. The speed limiting device of claim 1 wherein the table of the storage has vehicle information and tire information.

3. The speed limiting device of claim 2 wherein the communicator communicates with an external server and the controller updates information stored in the storage by receiving a new table from the external server by the communicator.

4. The speed limiting device of claim 3 wherein the communicator communicates with an external terminal and the controller receives tire information that is input via the external terminal by the communicator, is configured to determine whether a table having the received tire information is present by searching the storage, or asks the table having the tire information to the server.

5. A vehicle comprising:
    a chassis to which a vehicle wheel and a steering wheel are connected;
    a tire air pressure monitor provided at the vehicle wheel and configured to monitor an air pressure of tire of the vehicle wheel;
    a steering angle detector provided at the steering wheel and configured to detect a rotation angle of the steering wheel and output a steering angle corresponding to the detected rotation angle;
    a body connected to the chassis and configured to form an external;
    a yaw rate detector provided at the body and configured to detect a speed of changing a rotation angle of the body and output a yaw rate corresponding to the detected rotation angle of the body;
    a speed detector provided at the chassis and configured to detect a speed of the vehicle;
    a speed limiting device configured to acquire slip information based on the steering angle outputted by steering angle detector and the yaw rate outputted by the yaw rate detector when abnormality information is received from the tire air pressure monitor, to check a limited speed corresponding to the acquired slip information, and to limit a drivable speed as the checked limited speed; and
    an engine controller configured to control at least one of a number of revolution of an engine and a degree of opening of a throttle valve so that the speed of the vehicle detected by the speed detector does not exceed the checked limited speed.

6. The vehicle of claim 5 wherein the speed limiting device stores limited speed information corresponding slip information, in a form of a table.

7. The vehicle of claim 6 wherein the speed limiting device adjusts the limited speed information related to the table based on a period of use and a driving distance of the tire.

8. The vehicle of claim 6 further including:
a communicator configured to communicate with an external server, and wherein the speed limiting device receives a new table from the server through the communicator and stores the received new table by classifying the table by corresponding to tire information.

9. The vehicle of claim 6 wherein
a limited speed value of the limited speed information related to the table is more reduced as a slip angle in the slip information is increased.

10. The vehicle of claim 5 wherein the engine controller is configured to check the number of revolutions of the engine corresponding to the checked limited speed, and is configured to control the engine so that the engine rotates equal to or less than the checked the number of revolutions.

11. The vehicle of claim 5 wherein when the abnormality information is received from the tire air pressure monitor, the speed limiting device adjusts the checked limited speed by acquiring slip information in a predetermined time interval.

12. The vehicle of claim 5 wherein when the abnormality information is not received, the speed limiting device sets the drivable speed to a predetermined maximum speed.

13. A vehicle comprising:
a plurality of vehicle wheels including a wheel and a tire;
a chassis to which the plurality of vehicle wheels and a steering wheel are connected;
a plurality of wheel speed detectors provided at of each of the plurality of vehicle wheels and configured to detect a wheel speed of each of the plurality of vehicle wheels;
a steering angle detector provided at the steering wheel and configured to detect a rotation angle of the steering wheel and output a steering angle corresponding to the detected rotation angle;
a body connected to the chassis and configured to form an external;
a yaw rate detector provided at the body and configured to detect a speed of changing a rotation angle of the body and output a yaw rate corresponding to the detected rotation angle of the body;
a speed limiting device configured to determine whether an air pressure of at least one tire is out of a reference range based on the detected plurality of wheel speed, to acquire slip information based on the steering angle outputted by the steering angle detector and the yaw rate outputted by the yaw rate detector when the air pressure of at least one tire is out of the reference range and to check a limited speed corresponding to the acquired slip information, and to limit a drivable speed as the checked limited speed; and an engine controller configured to determine a speed of the vehicle based on the detected plurality of wheel speed, and control at least one of a number of revolution of an engine and a degree of opening of a throttle valve so that the determined speed of the vehicle does not exceed the limited speed received speed limiting device.

14. The vehicle of claim 13 wherein the speed limiting device stores limited speed information corresponding to slip information, in a form of a table, wherein a limited speed value of the limited speed information related to the table is more reduced as a slip angle in the slip information is increased.

15. A method for controlling a vehicle including a steering angle detector and a yaw rate detector, comprising:
checking by a controller, a steering angle detected by the steering angle detector and a yaw rate detected by the yaw rate detector when abnormality information related to tire air pressure is generated;
acquiring by the controller, slip information based on the detected steering angle and the detected yaw rate;
checking by the controller, a limited speed corresponding to the acquired slip information;
limiting, by the controller, a drivable speed of the vehicle as the checked limited speed; and
setting, by the controller, the drivable speed of the vehicle to a predetermined maximum speed when the abnormality information related to tire air pressure is not generated,
wherein the limiting the drivable speed of the vehicle as the checked limited speed includes:
detecting a speed of the vehicle and controlling a number of revolution of an engine so that the detected speed does not exceed the checked limited speed, and
checking a degree of opening of a throttle valve corresponding to the checked limited speed and controlling the throttle valve so that a de of opening of the throttle valve is equal to or less then the checked degree of opening.

16. The method of claim 15 wherein the checking the limited speed includes checking a pre-stored table, wherein the table includes limited speed information corresponding to slip information.

17. The method of claim 15 further including:
checking whether the abnormality information related to tire air pressure is received from a tire air pressure monitor.

18. The method of claim 15 further including:
checking whether a lamp indicating that tire air pressure is abnormal is turned on.

19. The method of claim 15 further including:
adjusting the checked limited speed by acquiring in a predetermined time interval the slip information when the abnormality information related to tire air pressure is generated.

* * * * *